United States Patent
Espostio et al.

(10) Patent No.: US 11,042,361 B1
(45) Date of Patent: Jun. 22, 2021

(54) MULTI-LANGUAGE MODEL PROCESSING

(71) Applicant: The Boeing Company, Chicago, IL (US)

(72) Inventors: Christopher D. Espostio, Issaquah, WA (US); Jeff Alan Heisserman, Clinton, WA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 16/719,687

(22) Filed: Dec. 18, 2019

(51) Int. Cl.
| | | |
|---|---|---|
| *G06F 9/44* | (2018.01) | |
| *G06F 8/10* | (2018.01) | |
| *G06F 8/41* | (2018.01) | |
| *G06F 8/30* | (2018.01) | |
| *G06F 30/15* | (2020.01) | |
| *G06F 30/13* | (2020.01) | |

(52) U.S. Cl.
CPC .............. *G06F 8/10* (2013.01); *G06F 8/31* (2013.01); *G06F 8/47* (2013.01); *G06F 30/13* (2020.01); *G06F 30/15* (2020.01)

(58) Field of Classification Search
None
See application file for complete search history.

(56) References Cited

U.S. PATENT DOCUMENTS

| | | | | |
|---|---|---|---|---|
| 9,280,326 B1 * | 3/2016 | Braun | .................. | G06F 8/37 |
| 10,157,246 B2 * | 12/2018 | Szpak | .................. | G06F 8/31 |
| 10,528,684 B1 * | 1/2020 | Ayubi-Moak | .................. | G06F 30/39 |
| 2005/0049736 A1 * | 3/2005 | Miyamoto | .................. | G06F 11/3447 717/101 |
| 2020/0241912 A1 * | 7/2020 | Bailey | .................. | G06F 8/31 |

OTHER PUBLICATIONS

Carlson, "Grammatical Programming: An Algebraic Approach to the Description of Design Spaces", 1997, Ph. D. Dissertation Carnegie Mellon University, Abstract Only, 2 pages.
Woodbury et al., "Geometric Design Spaces", (1989), Department of Architecture, Carnegie Mellon University, 19 pages.
Heisserman, "Generative Geometric Design and Boundary Solid Grammars", (1992), Ph. D. Dissertation Carnegie Mellon University, Abstract Only, 2 pages.

* cited by examiner

*Primary Examiner* — Qamrun Nahar
(74) *Attorney, Agent, or Firm* — Yee & Associates, P.C.

(57) ABSTRACT

A method, apparatus, system, and computer program product for applying design rules in multiple programming languages to sets of multiple designs composed of models of objects representing these product designs. A request is received to apply the design rule to a model of a product. The design rule is written in a source code that is run to apply the design rule to the model. Sections in the source code corresponding to different programming languages identified. The source code for the design rule is run using language processors corresponding to the different programming languages identified in the sections in the source code and using language configuration information that describes parameters for executing the source code using the language processors, wherein a set of operations is performed on the model when the source code is run.

24 Claims, 9 Drawing Sheets

400

```
cuberule (World, [World], [World]):-
        isWorld(World),
        not (world_topPartOccurrence (World, _PartOccurrence) ).
```

402 —
```java
public class CubeRule extends PrologRuleBase {
    public CubeRule ( ) {
        name = "Make Cube";
        condition = "No initial cube exists (PrologJava)";
        description = "Create an initial cube (PrologJava)";
    }
```

404 —
```java
    @Override
    public void apply(Object [ ] variables)  {
                World world = (World) variables [0] ;
                Model model = Euler.makePartAndModel ( );
                Modeler.makeOrthogonalCuboid (model, new Point3D (7.0, 7.0, 7.0) ) ;
                world.setName ("Prolog Java Cube World");
                world.initialize (model.getPart( ) ) ;
    }
}
```

```
cuberule (World, [World], [World]):-
        isWorld(World),
        not (world_topPartOccurrence (World, _PartOccurrence) ).
```

502 —
```javascript
var CubeRule = new JavaAdapter (Packages.org.osskbe.generate.DesignRule, {
    CubeRule: function ( ) {
                this.name = "Make Cube";
                this.condition = "No initial cube exists (JavaScript)";
                this.description = "Create an initial cube (JavaScript)";
    },
```

504 —
```javascript
    apply: function (variables) {
                var world = variables [0] ;
                var model = Euler.makePartAndModel ( );
                Modeler.makeOrthogonalCuboid (model, new Point3D (7.0, 7.0, 7.0) ) ;
                world.setName ("JavaScript Cube World");
                world.initialize (model.getPart( ) ) ;
    }
});
```

FIG. 5

```
cuberule (World, [World], [World]):-
        isWorld(World),
        not (world_topPartOccurrence (World, _PartOccurrence) ).

class CubeRule extends PrologRuleBase {
        name = "Make Cube"
        condition = "No initial cube exists (PrologScala)";
        description = "Create an initial cube (PrologScala)";
```
602

```
        def apply (variables: Array [Object] ) {
                val world = variables (0) . asInstanceOf [World]
                val model = Euler.makePartAndModel ( )
                Modeler.makeOrthogonalCuboid (model, new Point3D (7.0, 7.0, 7.0) )
                world.setName ("Prolog Scala Cube World")
                world.initialize (model.getPart( ) )
        }
}
```
604

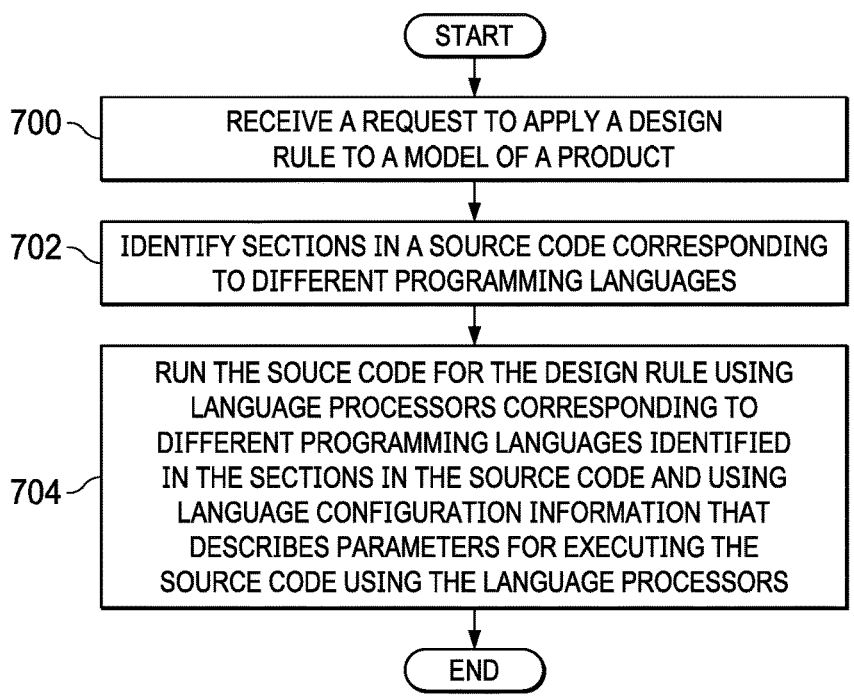

FIG. 7

MULTI-LANGUAGE MODEL PROCESSING

BACKGROUND INFORMATION

1. Field

The present disclosure relates generally to an improved computer system and, in particular, to a method, apparatus, system, and computer program product for applying design rules in multiple programming languages to sets of multiple designs composed of models of objects representing these product designs.

2. Background

Automation and optimization tools may be used to design and manage complex designs, families of designs, and design alternatives for complex products. For example, without limitation, such tools may be used to design and manage designs for complex aerospace products, such as aircraft, which may be composed of millions of parts and components. The use of such tools may be necessary or desirable to produce feasible designs, close a development business case, reduce extensive non-recurring engineering costs, and to do so with the goal of breaking the development cost curve.

In designing an aircraft, many models are generated for the aircraft. These models can include designs of structures, systems, subsystems, components, and other parts for the aircraft. In generating these models, various design rules are present. These design rules can specify requirements such as those by a manufacturer, a government entity, a standard, or some other source of requirements.

For example, if a model of a part is to be used with additive manufacturing processes, including three-dimensional printing, the model may need to follow rules from an additive manufacturing standard that enables the model to be used in an additive manufacturing process. If the model of the part is for use in a different manufacturing process, a different set of rules from another standard for the selected manufacturing process may be used to ensure that the part can be manufactured as desired using the selected manufacturing process.

As a result, many different types of design rules can be present based upon different rules and regulations that apply to the particular structure, system, subsystem, component, or other part of interest. Applying these design rules to models for a product can be more complex, difficult, and time-consuming than desired.

Therefore, there may be a need for a method and apparatus that take into account at least some of the issues discussed above, as well as other possible issues.

SUMMARY

An embodiment of the present disclosure provides a method for multi-language processing of a design rule. A request is received to apply the design rule to a model of a product. The design rule is written in a source code that is run to apply the design rule to the model. Sections in the source code corresponding to different programming languages are identified. The source code for the design rule is run using language processors corresponding to the different programming languages identified in the sections in the source code and using language configuration information that describes parameters for executing the source code using the language processors, wherein a set of operations is performed on the model when the source code is run.

Another embodiment of the present disclosure provides a design rule application system comprising a computer system and a design generator in the computer system. The design generator is configured to receive a request to apply a design rule to a model of a product. The design rule is written in a source code that is run to apply the design rule to the model and identify sections in the source code corresponding to different programming languages. The design generator is configured to run the source code for the design rule using language processors corresponding to the different programming languages identified in the sections in the source code and using language configuration information that describes parameters for executing the source code using the language processors, wherein a set of operations is performed on the model when the source code is run.

Yet another embodiment of the present disclosure provides a computer program product for multi-language processing of a design rule, wherein the computer program product comprises a computer-readable storage media and first program code, second program code, and third program code stored on the computer-readable storage media. The first program code is executed to receive a request to apply the design rule to a model of a product. The design rule is written in a source code that is run to apply the design rule to the model. The second program code is executed to identify sections in the source code corresponding to different programming languages. The third program code is executed to run the source code for the design rule using language processors corresponding to the different programming languages identified in the sections in the source code and using language configuration information that describes parameters for executing the source code using the language processors, wherein a set of operations is performed on the model when the source code is run.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a design rule using Prolog and Java in accordance with an illustrative embodiment;

FIG. 5 is an illustration of a design rule using Prolog and JavaScript in accordance with an illustrative embodiment;

FIG. 6 is an illustration of a design rule using Prolog and Scala in accordance with an illustrative embodiment;

FIG. 7 is an illustration of a flowchart of a process for supporting multi-language processing in accordance with an illustrative embodiment;

DETAILED DESCRIPTION

Figure 1:
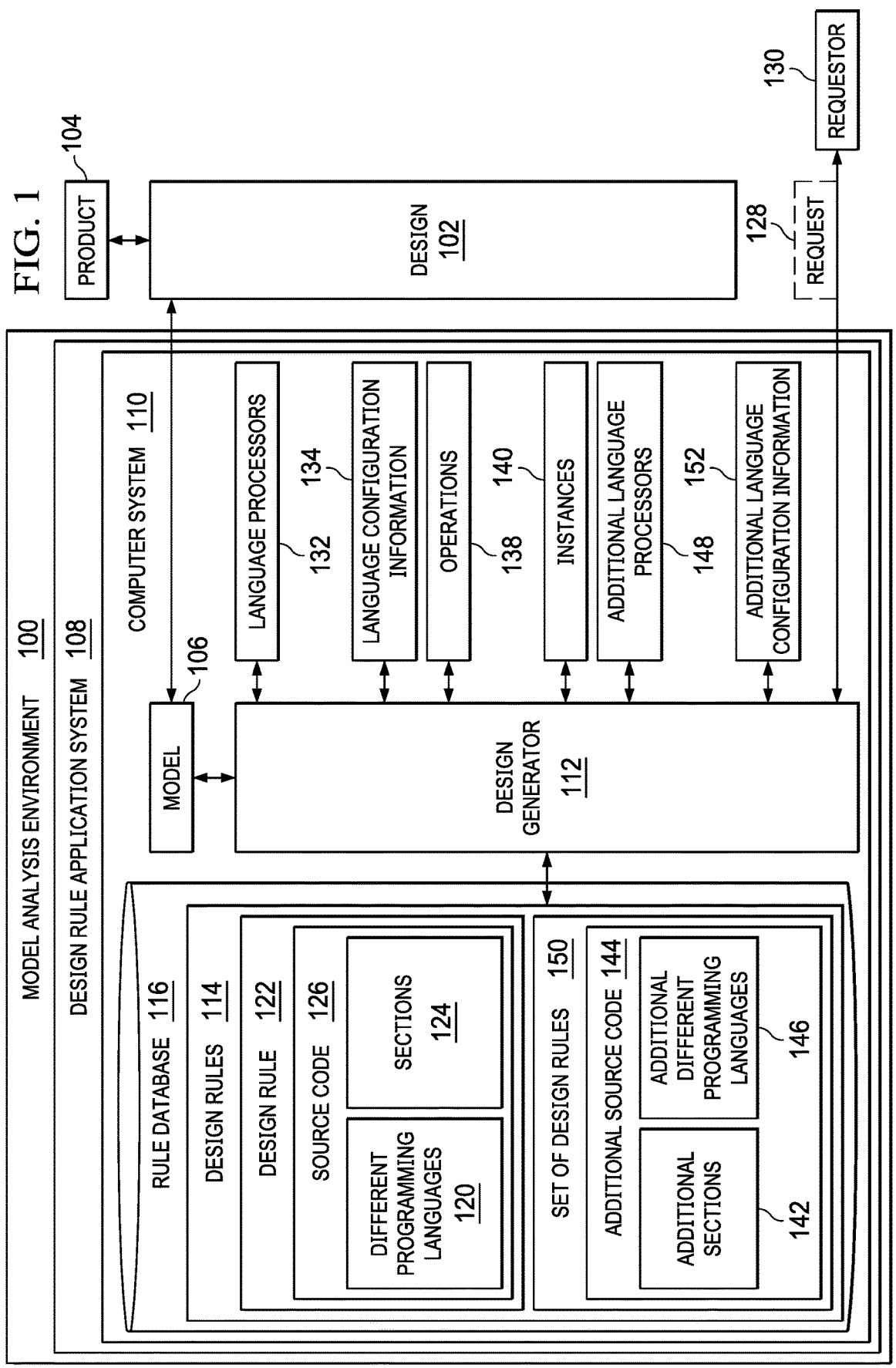
FIG. 1 is an illustration of a block diagram of a design generation and analysis environment in accordance with an illustrative embodiment.

The illustrative embodiments recognize and take into account one or more different considerations. For example, the illustrative embodiments recognize and take into account that multidisciplinary design analysis and optimization is being increasingly applied in the development of designs for products to achieve more robust designs. The illustrative embodiments recognize and take into account that models generated for the designs are increasingly created with an eye towards additive manufacturing and three-dimensional printing. The illustrative embodiments recognize and take into account that these and other types of manufacturing processes may have different design rules that are applied to the models of these designs.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments recognize and take into account that a set of design rules for the design of a product can be applied to a model for the product or a portion of the product by a model analysis tool with the results of the design rule application being output by the analysis model tool.

As used herein, a "set of," when used with reference to items, means one or more items. For example, a "set of design rules" is one or more design rules.

The illustrative embodiments recognize and take into account that the application of design rules can become more complex as the models are scaled to at least one of a more complex design, an additional discipline, or a different design concept. The illustrative embodiments also recognize and take into account that these design rules can be implemented using programming languages. The illustrative embodiments also recognize and take into account that a design rule has two parts. The two parts comprise a match condition and an apply operation that is performed when the match condition is present. The illustrative embodiments recognize and take into account that a programming language that is optimal for implementing a match condition of a design rule may not be as optimal as compared to another programming language for the apply operation portion of the design rule.

The illustrative embodiments recognize and take into account that the "match condition" portion of a design rule is primarily concerned with evaluating logical conditions against a set of components in a model, and the results of this evaluation for one component can be largely independent of the results for another component. The illustrative embodiments recognize and take into account that the "read-only" nature of this work, coupled with the independence of branches in a hierarchically organized design, opens up significant opportunities for parallelism, tempered by the usual difficulties that developers encounter when designing and implementing explicit parallelism at the application level. The illustrative embodiments recognize and take into account that some versions of logic languages support concurrency mechanisms at the language and library level to offset these difficulties.

The illustrative embodiments recognize and take into account that the "apply operation" portion of the design rule implements a set of effects of the design rule.

The illustrative embodiments recognize and take into account that it is possible for the successful parallel output of the match piece of a design rule to be piped in parallel to the apply operation portion of the design rule where needed with an iteration over the result set also being available. The illustrative embodiments recognize and take into account that it is also possible for the result of the apply operation portion to be logical in type, as would be the case in design validation or verification. However, the illustrative embodiments recognize and take into account that it is also commonly the case that the point of the apply operation portion of the design rules can generate and modify new entities or modify already existing ones in the model. In these cases, the illustrative embodiments recognize and take into account that an amount of procedural sequential operations can be present. For example, a piece of geometry in a model may need to be created before a set of attributes for the piece of geometry can be set.

The illustrative embodiments recognize and take into account that logic languages, such as Prolog, have an advantage for defining the match condition portion of a design rule. The illustrative embodiments recognize and take into account that the code written using Prolog is more concise. The illustrative embodiments recognize and take into account that this conciseness allows the author of the match condition portion of the design rule to focus on what conditions need to be satisfied without cluttering the code with implementation details. The illustrative embodiments recognize and take into account that Prolog is easier to read and understand than many other languages.

The illustrative embodiments recognize and take into account that a tradeoff with using a programming language such as Prolog is that less direct control over lower level details of execution flow and application state management are present as compared to a more procedural language, such as Java. The illustrative embodiments recognize and take into account that the tradeoffs of using logic languages, such as Prolog, turn out to be strengths of more traditional procedural languages, such as Java. The illustrative embodiments recognize and take into account that this tradeoff may be why procedural languages are favored for the apply operation portion of a design rule.

Thus, the illustrative embodiments provide a method, apparatus, system, and computer program product that can be used to enable processing a design using multiple languages. In one illustrative example, a request is received to apply a design rule to a model of a product. The design rule is written in a source code that is run to apply the design rule to the model. Sections in the source code corresponding to different programming languages are identified. The source code for the design rule is run using language processors corresponding to the different programming languages identified in the sections in the source code and using language configuration information that describes parameters for executing the source code using the language processors, wherein a set of operations is performed on the model when the source code is run.

With reference now to FIG. 1, an illustration of a design generation and analysis environment is depicted in accordance with an illustrative embodiment. In this illustrative example, model analysis generation and environment 100 is an environment in which design 102 for product 104 is embodied in model 106.

In the illustrative example, product 104 can take a number of different forms. For example, product 104 can be selected from a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a wing, an engine, a cowling, a fairing, a leading edge slat, a skin panel, a fastener, a wiring subassembly, a light, a door, a bin, a pipe, a handle, a switch, a chip, a processor unit, a robotic arm, a crawler, or other suitable products.

As used herein, a "number of," when used with reference to items, means one or more items. For example, a "number of different forms" is one or more different forms.

In this illustrative example, model 106 is electronic data for design 102 in a form that can be processed by a processor unit in a computer or other computing device. As depicted, model 106 can take a number of different forms. For example, model 106 can be one of a two-dimensional model or a three-dimensional model. As another example, model 106 can be a computer-aided design (CAD) model, a computer-aided manufacturing (CAM) model, or some other suitable type of model that can be processed by a processor unit in a computer.

As depicted, model 106 can be analyzed in design rule application system 108 to determine whether model 106 meets a set of design rules 114 in rule database 116 in design rule application system 108.

In this illustrative example, design rules 114 can be derived from various sources. Design rules 114, as used herein, may be one or more requirements to which model 106 should comply. For example, design rules 114 can be based on at least one of a manufacturer requirement, a manufacturer specification, a government regulation, an industry standard, a manufacturing process requirement, or some other type of requirement or specification.

Further, model 106 can be comprised of multiple models. For example, when product 104 is an aircraft, model 106 for the aircraft can be comprised of millions of models for systems, subsystems, and components that form the aircraft.

Design rule application system 108 comprises computer system 110 and design generator 112 in computer system 110. As depicted, design generator 112 can operate to perform at least one of generating designs or checking designs.

In this illustrative example, design generator 112 can be implemented in software, hardware, firmware, or a combination thereof. When software is used, the operations performed by design generator 112 can be implemented in program code configured to run on hardware, such as a processor unit. When firmware is used, the operations performed by design generator 112 can be implemented in program code and data and stored in persistent memory to run on a processor unit. When hardware is employed, the hardware can include circuits that operate to perform the operations in design generator 112.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 110 is a physical hardware system and includes one or more data processing systems. When more than one data processing system is present in computer system 110, those data processing systems are in communication with each other using a communications medium. The communications medium can be a network. The data processing systems can be selected from at least one of a computer, a server computer, a tablet computer, or some other suitable data processing system.

In this illustrative example, design rules 114 in rule database 116 are also part of design rule application system 108. Rule database 116 can be in a single location. In some illustrative examples, rule database 116 can be distributed in multiple locations.

Design rules 114 can include a number of different types of design knowledge from a number of different sources. Design rules 114 includes a number of different type of rules. For example, design rules 114 can include at least one of a user program specific rule, a user product development rule, a user design standard, and industry standard design rule, a licensed design rule, a university design rule, a government design rule, or other suitable types of rules that can be applicable to design 102 for product 104. For example, design rules 114 for product 104 in the form of an aircraft can be based on different standards and government regulations as compared to when product 104 is a building.

As depicted, design generator 112 supports multi-language processing with respect to applying a set of design rules 114 to model 106. In this illustrative example, design rules 114 are written in different programming languages 120. For example, design rule 122 in design rules 114 comprises sections 124 in source code 126 in different programming languages 120. In other words, one section in sections 124 is in a first programming language while a second section in sections 124 can be in a second programming language.

In the process of analyzing model 106, design generator 112 receives request 128 from requester 130 to apply design rule 122 to model 106 of product 104. In this illustrative example, request 128 can be received during at least one of a design generation, a design modification, a design checking, or some other phase or operation in generating design 102.

Design rule 122 is written in source code 118 that is run to apply design rule 122 to model 106. In this illustrative example, requester 130 can be a human operator, a program, or some other hardware or software component.

As depicted, design generator 112 identifies sections 124 in source code 126 corresponding to different programming languages 120.

In the illustrative example, design generator 112 runs source code 126 for design rule 122 using language processors 132 corresponding to different programming languages 120 identified in sections 124 in source code 126 and using language configuration information 134 that describes parameters for executing source code 126 using language processors 132. In the illustrative example, a parameter can be a variable, an argument, a setting, an option, or some other suitable numerical or other measurable factor forming one of a set that defines a system or sets of conditions of its operation.

A language processor in language processors 132 is software or hardware that is designed to perform tasks such as processing source code 126 in a programming language to perform tasks specified by source code 126. The tasks can include processing source code 126 into bytecode or machine code used by a processor in a data processing system. For example, the programming language can be Java, Prolog, or some other suitable programming language. A language processor can take a number of forms. For example, a language processor can include at least one of an interpreter or a translator.

As depicted, language configuration information 134 comprises at least one of a name of a programming language, a location of the language processor, a version requirement, a project specific parameter, a language specific parameter, or other information needed by a language processor to run source code 126.

In the illustrative example, language configuration information 134 can be located in a number of different locations. For example, language configuration information 134 can be metadata located in at least one of source code 126, a file (e.g., a configuration file), a model, a module, a data structure, or some other suitable location.

For example, a module can be a software component such as a Java archive (JAR) file. When the module is used, the module can include the source code along with additional data such as files and metadata that describes how to associate the sections of the design rules with particular language processors, parameters for use in writing the source code, and other suitable types of information for use in applying the design rule to a model. In the illustrative example, this module can include source code for applying design rules. A rule in the design rules in the module can be implemented using source code written in two or more programming languages.

In the illustrative example, a set of operations 138 is performed on model 106 when source code 118 is run. These operations can be selected from at least one of modifying a geometry in the design, generating a new geometry, setting an attribute, modifying an attribute, applying another design rule, or some other operation based on executing source code 126 for design rule 122.

In executing source code 118 for design rule 122, design generator 112 can initialize an instance of a language processor in language processors 132 for each different programming language in the different programming languages identified in sections 124 in source code 126 for design rule 122 to form instances 140 of language processors 132. Further, design generator 112 can run source code 126 in a section in sections 124 using the instance of the language processor corresponding to a programming language in different programming languages 120 identified for the section. Additionally, at least one of design generator 112 or a language processor in language processors 132 can run in at least one of a virtual machine, a system virtual machine, a process virtual machine, a Java virtual machine, a physical computer, or on some other physical or virtual system that processes data.

In another illustrative example, request 128 received by design generator 112 can include a set of design rules 114 in addition to design rule 122 for application to model 106 of product 104. In this example, design generator 112 can identify additional sections 142 in additional source code 144 for set of design rules 150 in design rules 114 corresponding to additional different programming languages 146.

Design generator 112 can run the additional source code 144 for the set of design rules 150 in parallel with source code 118 for design rule 122 using additional language processors 148 corresponding to additional different programming languages 146 identified in additional sections 142 in additional source code 144 and using additional language configuration information 152 that describes parameters for executing additional source code 144 using additional language processors 148. For example, executing source code 144 in parallel includes concurrent execution of design rules 146. The set of operations 138 are performed on model 106 when source code 118 and additional source code 144 are run.

Figure 2:
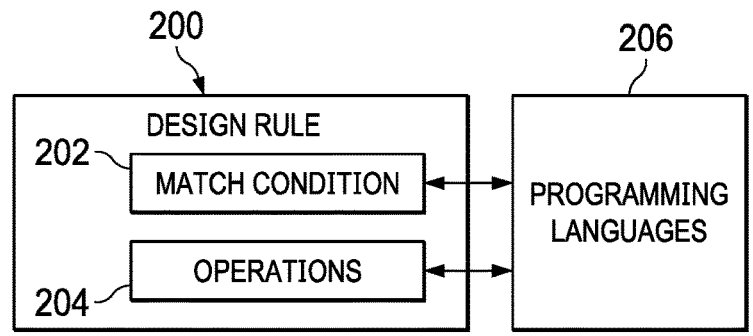
FIG. 2 is an illustration of a block diagram of a design rule in accordance with an illustrative embodiment.

Turning next to FIG. 2, an illustration of a block diagram of a design rule is depicted in accordance with an illustrative embodiment. In the illustrative examples, the same reference numeral may be used in more than one figure. This reuse of a reference numeral in different figures represents the same element in the different figures. In this illustrative example, design rule 200 is an example of one implementation for a design rule in design rules 114 in FIG. 1.

As depicted, design rule 200 comprises match condition 202 and a set of operations 204. The set of operations 204 performed in match condition 202 indicates that design rule 200 is applicable to model 106 in FIG. 1.

In this illustrative example, match condition 202 is in a first set of programming languages 206 in a plurality of programming languages 206. Match condition 202 can be used to determine if logical conditions indicate that design rule 200 is applicable.

The set of operations 204 is in a second set of programming languages 206 in the plurality of programming languages 206. As depicted, a programming language in the first set of programming languages 206 is different from a programming language in the second set of programming languages 206. The set of operations 204 is one or more actions that can be performed if design rule 200 is determined to be applicable.

The set of operations 204 can take a number of different forms. For example, the set of operations 204 performed with respect to model 106 in FIG. 1 can include at least one of adding a component, removing a component, changing a component, generating an alert, adjusting a parameter, or some other suitable action with respect to model 106.

In this illustrative example, the selection of a programming language for match condition 202 can be based on which programming languages are best suited for conditions such as logical conditions used to determine whether design rule 200 is applicable to model 106.

The selection of a programming language for use in the second set of programming languages 206 for the set of operations 204 for design rule 200 can be made based on which programming language or languages are best suited for performing one or more operations when match condition 202 is met.

In selecting programming languages for match condition 202 and the set of operations 204, match condition 202 is concerned with evaluating logical conditions against a set of components in model 106. With match condition 202, results for the evaluation of components are often independent from one another. Further, only read-only access is needed to model 106. As a result, opportunities for parallelism are present in match condition 202.

The set of operations 204 in design rule 200 is selected from at least one of creating a component or modifying a component in model 106. The set of operations 204 are more likely to have sequential operations or procedural operations such as operations used to create a new component, such as a cube, and set attributes for the new component in model 106.

In illustrative example, logical programming languages in programming languages 206 can be considered suitable implementing match condition 202 in design rule 200. Operational and object-oriented languages in programming languages 206 can be suitable for implementing operations 204 in design rule 200. Operational an object-oriented languages involve describing the procedure to match the conditions. In contrast, logical languages define the conditions in do not need to describe the procedure to match conditions.

For example, Prolog is a logical programming language that is considered to excel in describing logical conditions that can be used in match condition 202 for describing logical conditions for determining whether design rule 200 applies to model 106. Other programming languages also can be used for match condition 202 in addition to or in place of Prolog. Other suitable programming languages include, for example, C-Prolog, ALS Prolog, SWI Prolog, tuProlog, Mercury, ECLiPSe, ALF, and other suitable logic programming languages.

As depicted, languages such as Java, JavaScript, Lisp, Python, Ruby, and Scala are considered to be very well-suited for forming the set of operations 204 and design 200. Thus, these programming languages can be used for the set of operations 204 in design rule 200.

Figure 3:
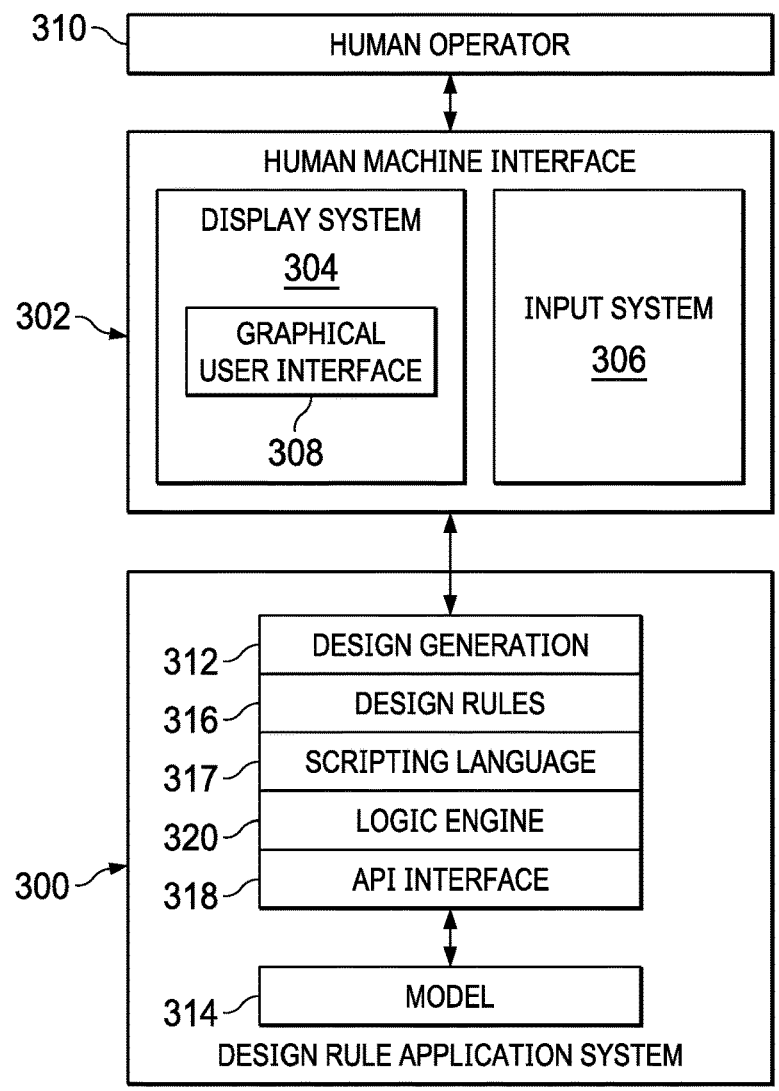
FIG. 3 is an illustration of a block diagram of a design rule application system in accordance with an illustrative embodiment.

With reference next to FIG. 3, an illustration of a block diagram of a design rule application system is depicted in accordance with an illustrative embodiment. In this illustrative example, design rule application system 300 is an example of one implementation for design rule application system 108 in FIG. 1. In this depicted example, design generation 312, scripting language 317, API interface 318, and logic engine 320 are examples of components that may be implemented in design generator 112 in FIG. 1.

As depicted, human operator 310 can interact with design rule application system 300 through human machine interface 302. Human machine interface 302 is a hardware system comprising display system 304 and input system 306. Display system 304 is a physical hardware system and includes one or more display devices on which graphical user interface 308 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 310 can interact with graphical user interface 308 through user input generated by input system 306. Input system 306 is a physical hardware system and can be selected from at least one of a mouse, a keyboard, a trackball, a touchscreen, a stylus, a motion sensing input device, a cyber glove, or some other suitable type of input device.

As depicted, design generation 312 can receive user input from human operator 310 through human machine interface 302. This user input can be used to cause design generation 312 to create model 314 for a product. Additionally, the user input can also be used to apply design rules 316 to model 314.

As depicted, scripting language 317 enables using a scripting language to map design rules 316 to a specific scripting language to an underlying framework for applying the rules to model 314. In this illustrative example, the underlying framework is API interface 318. For example, scripting language can be, for example, Scala, JavaScript, or Python. This component also provides scripting language implementations and mappings to an underlying framework, such as Java, using API interface 318.

In the illustrative example, scripting languages are built on top of a Java platform using application programming interfaces (APIs) such as Java Scripting Language APIs in API interface 318.

As depicted, logic engine 320 can provide an interface for a language such as Prolog. Logic engine 320 can be used to implement the conditions of a design implemented as Prolog predicates in this particular example. For example, logic engine 320 can provide mapping from a design predicate in Prolog to a Java API in API interface 318.

As depicted, design generation 312 can identify design rules 316 that are available for use by human operator 310. Design rules 316 can be displayed in graphical user interface 308 to enable human operator 310 to select one or more of design rules 316 for application to model 314.

In one illustrative example, one or more technical solutions are present that overcome a technical problem with efficiently developing design rules for models of products. As a result, one or more technical solutions can provide a technical effect of more than one programming language in which different sections of a design rule can be written in the programming language that is most desirable for that particular section. For example, one or more technical solutions can include a design rule in which a match condition is written in one programming language and a set of operations is written in another programming language.

Computer system 110 in FIG. 1 can be configured to perform at least one of the steps, operations, or actions described in the different illustrative examples using software, hardware, firmware, or a combination thereof. As a result, computer system 110 operates as a special purpose computer system in which design generator 112 in FIG. 1 in computer system 110 enables applying design rules to models using design rules in which a design rule in the design is written in multiple programming languages. In particular, design generator 112 transforms computer system 110 into a special purpose computer system as compared to currently available general computer systems that do not have design generator 112.

In the illustrative example, the use of design generator 112 in computer system 110 integrates processes into a practical application for a method for multi-language processing of a design rule that increases the performance of computer system 110. In other words, design generator 112 in computer system 110 is directed to a practical application of processes integrated into design generator 112 in computer system 110 that uses programming languages for different sections of the design rule which the programming language can be selected as one that is most efficient in computer system 110. This efficiency can be at least one of increasing a speed at which rules are applied to models or decreasing resources used in computer system 110. Further, the use of design rules in multiple languages can also reduce the effort or difficulty in creating and maintaining design rules, including due to their familiarity and readability by the design rule developers and maintainers.

The illustrations of model generation and analysis environment 100 and the different components in this environment in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, design rule 122 has been described as being in two programming languages in different programming languages 120. In other illustrative examples, other numbers of programming languages can be used such as three or four program languages.

Further, although the illustrative example shows design generator 112 operating on a single model forcing design, design generator 110 can operate to perform at least one of checking or generating models for many designs. For example, a set of designs can be created in which multiple models for a wing be generated in which parameters such as length, width, material, thickness, twist, and other parameters can be varied for each model in design. Additionally, the models can include different landing gear systems with different locations that may be fixed or retractable with respect to the wing or other structures.

Design rules 114 can be applied by design generator 112 to check the design from the set of designs to determine which designs are feasible. In other illustrative examples, the designs can be generated using design generator 112 to apply design rules 114 during the generation of this design world. In this manner, many designs can be checked or generated in an illustrative example as compared to current systems in which the checking and generation is limited to a single model or design.

Turning next to FIGS. 4-6, illustrations of a design rule are depicted in accordance with an illustrative embodiment. The same design rule is depicted in these figures using different programming languages. The design rule has two sections of source code. The first section is a match condition for determining whether a design referred to as "world" is present. If "world" is present, the second section of source code in the design rules is an operation that generates a three-dimensional geometric part in the form of a cube the design called "world" if an initial cube is not present in "world".

Turning first to FIG. 4, an illustration of a design rule using Prolog and Java is depicted in accordance with an illustrative embodiment. As depicted, design rule 400 is an example of an implementation of design rule 122 in FIG. 1.

As depicted, section 402 is source code in Prolog for a match condition part of design rule 400. Prolog is an interpreted, declarative, logic programming language. This language is particularly suitable for determining a match condition.

In this depicted example, section 402 determines whether a design called "world" is present. Section 402 also determines whether any part occurrences are present in the design.

As depicted, section 404 illustrates operations that can be performed to modify the design. The operations in section 404 are written in Java as the source code. Java is a statically typed, compiled, object-oriented, procedural programming language that is suitable for performing operations when a match condition is met.

In this example, the operations in section 404 reference the given design "world" as variable world; create a three-dimensional part and model. The operations also create a cube (with one corner at the origin and the most distant point at (7.0, 7.0, 7.0) as part of the new model and gives the design world a name "Cube World". The process then creates an instance of the new part in the design "world".

With design rule 400, the source code in section 402 is run using a Prolog language processor. The source code in section 404 is run using a Java language processor.

With reference next to FIG. 5, an illustration of a design rule using Prolog and JavaScript is depicted in accordance with an illustrative embodiment. In this depicted example, design rule 500 is another example of an implementation of design rule 122 in FIG. 1.

In design rule 500, the source code in section 502 is Prolog and is the match condition for design rule 500. The source code in section 504 is JavaScript. In this example, the match condition in section 502 is the same as the match condition in section 402 in design rule 400 in FIG. 4. The operations in section 504 are the same operations as in section 404, except the operations are written in JavaScript instead of Java. JavaScript is a high-level, interpreted scripting programming language that is also suitable for performing operations when a match condition is met.

In this illustrative example, the source code in section 502 is run using a Prolog language processor. The source code in section 504 is run using a JavaScript language processor.

In FIG. 6, an illustration of a design rule using Prolog and Scala is depicted in accordance with an illustrative embodiment. As depicted, design rule 600 is yet another example of an implementation of design rule 122 in FIG. 1.

In this illustrative example, the source code in section 602 in design rule 600 is Prolog. This section contains the match condition for design rule 600. The source code in section 604 is Scala. As depicted, the match condition in section 602 is the same as the match condition in section 402 in design rule 400 in FIG. 4 and the match condition in section 502 in design rule 500 in FIG. 5.

The operations in section 604 are the same operations as in section 404 in FIG. 4 and in section 504 in FIG. 5, except the operations are written in Scala instead of Java in section 404 and JavaScript in section 504. Scala is a high-level, statically-typed, compiled, object-oriented, procedural programming language suitable for performing operations when a match condition is met.

As depicted, the source code in section 602 is run using a Prolog language processor. The source code in section 604 is run using a Scala language processor.

The illustrations of design rule 400 in FIG. 4, design rule 500 in FIG. 5, and design rule 600 in FIG. 6 are provided as example implementations of design rule 122 in FIG. 1 and not meant to limit the manner in which other design rules can be implemented. For example, in other illustrative examples, the source code for the operations performed can be implemented using other programming languages such as Lisp, Python, and Ruby. As another example, other programming languages for implementing match conditions in source can include Mercury, ECLiPSe, and ALF.

Turning next to FIG. 7, an illustration of a flowchart of a process for supporting multi-language processing is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in design generator 112 in computer system 110 in FIG. 1. The process in this figure is used to process a rule written in multiple program languages.

The process begins by receiving a request to apply a design rule to a model of a product (operation 700). The design rule is written in a source code that is run to apply the design rule to the model. The process identifies sections in a source code corresponding to different programming languages (operation 702).

The process runs the source code for the design rule using language processors corresponding to different programming languages identified in the sections in the source code and using language configuration information that describes parameters for executing the source code using the language processors (operation 704). The process terminates thereafter. A set of operations is performed on the model when the source code is run.

Figure 8:
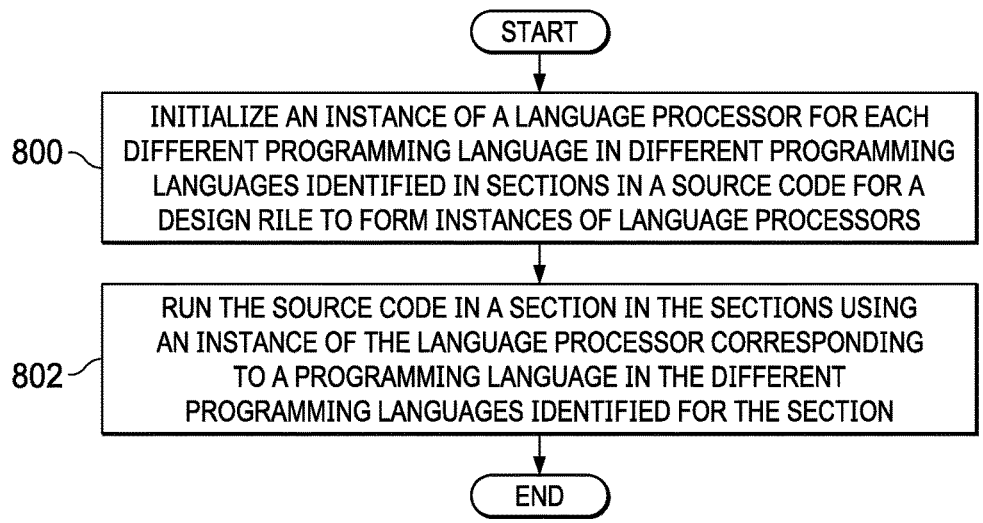
FIG. 8 is an illustration of a flowchart of a process for executing source code in accordance with an illustrative embodiment.

With reference next to FIG. 8, an illustration of a flowchart of a process for executing source code is depicted in accordance with an illustrative embodiment. The process in FIG. 8 is an example of one implementation for operation 704 in FIG. 7.

The process begins by initializing an instance of a language processor for each different programming language in different programming languages identified in sections in a source code for a design rule to form instances of language processors (operation 800). The process runs the source code in a section in the sections using an instance of the language processor corresponding to a programming language in the different programming languages identified for the section (operation 802). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
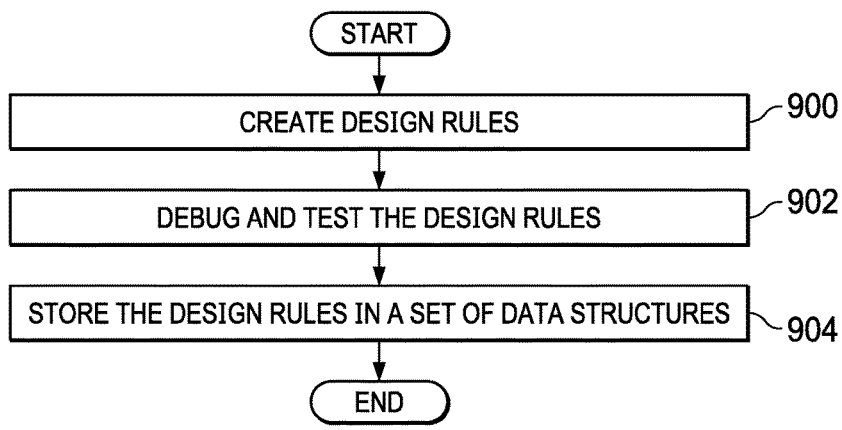
FIG. 9 is an illustration of a flowchart of a process for creating design rules in accordance with an illustrative embodiment.

With reference to FIG. 9, an illustration of a flowchart of a process for creating design rules is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in design generator 112 in computer system 110 in FIG. 1.

The process begins by creating design rules (operation 900). As depicted, operation 900 can be performed in an integrated development environment in which a design rule developer writes code that describes match conditions and a set of operations for a design.

In this illustrative example, the integrated development environment is a software application that provides comprehensive facilities for human operators to develop software such as design rules. An integrated development environment can include a source code editor, a build automation tool, and a debugger. An integrated development environment can also include a compiler, an interpreter, and other components needed for software development.

These design rules can be based on various sources such as, for example, industry standards, manufacturer specifications, customer rules, customer specifications, government regulations, and other sources of requirements that can be implemented in the design rules by the design rule developer.

The process then debugs and tests the design rules (operation 902). Operation 902 can be formed iteratively to ensure that the design rules provide desired results when applied to models for a product.

The process then stores the design rules in a set of data structures (operation 904). The process terminates thereafter. In this illustrative example, the set of data structures storing the design rules can be one or more files or a module. The module can also include other information. This other information can include metadata that describes how to associate part of the design with models. The module can be, for example, a JAR file.

Figure 10:
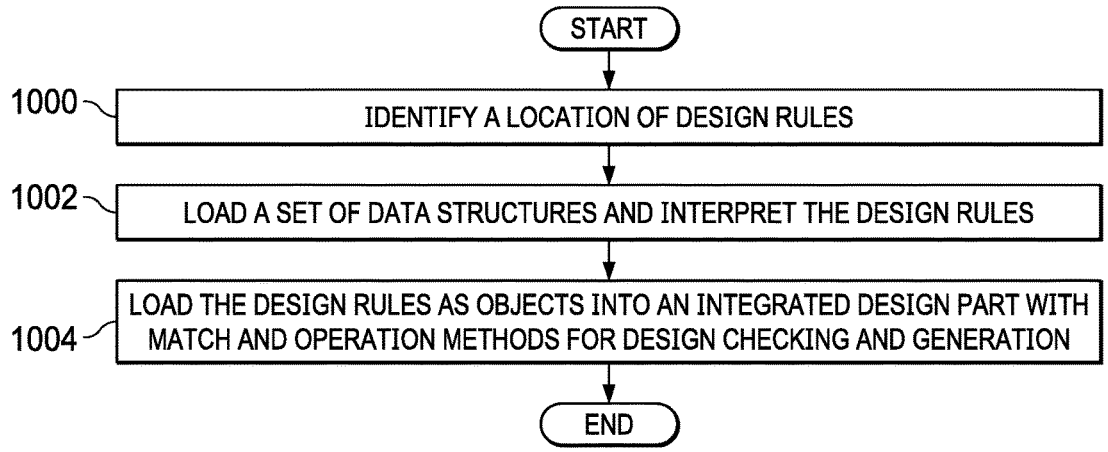
FIG. 10 is an illustration of a flowchart of a process for loading design rules in accordance with an illustrative embodiment.

Turning to FIG. 10, an illustration of a flowchart of a process for loading design rules is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in design generator 112 in computer system 110 in FIG. 1.

In this illustrative example, the process begins by identifying a location of design rules (operation 1000). The location of the design rules can be in a set of data structures such as, for example, a set of files, or a module in this illustrative example.

The process then loads a set of data structures and interprets the design rules (operation 1002). In this illustrative example, the interpretation performed in operation 1002 can be performed using metadata and other data in the set of data structures with respect to the design rules.

The process then loads the design rules as objects into an integrated design part with match and operation methods for design checking and generation (operation 1004). The process terminates thereafter.

Figure 11:
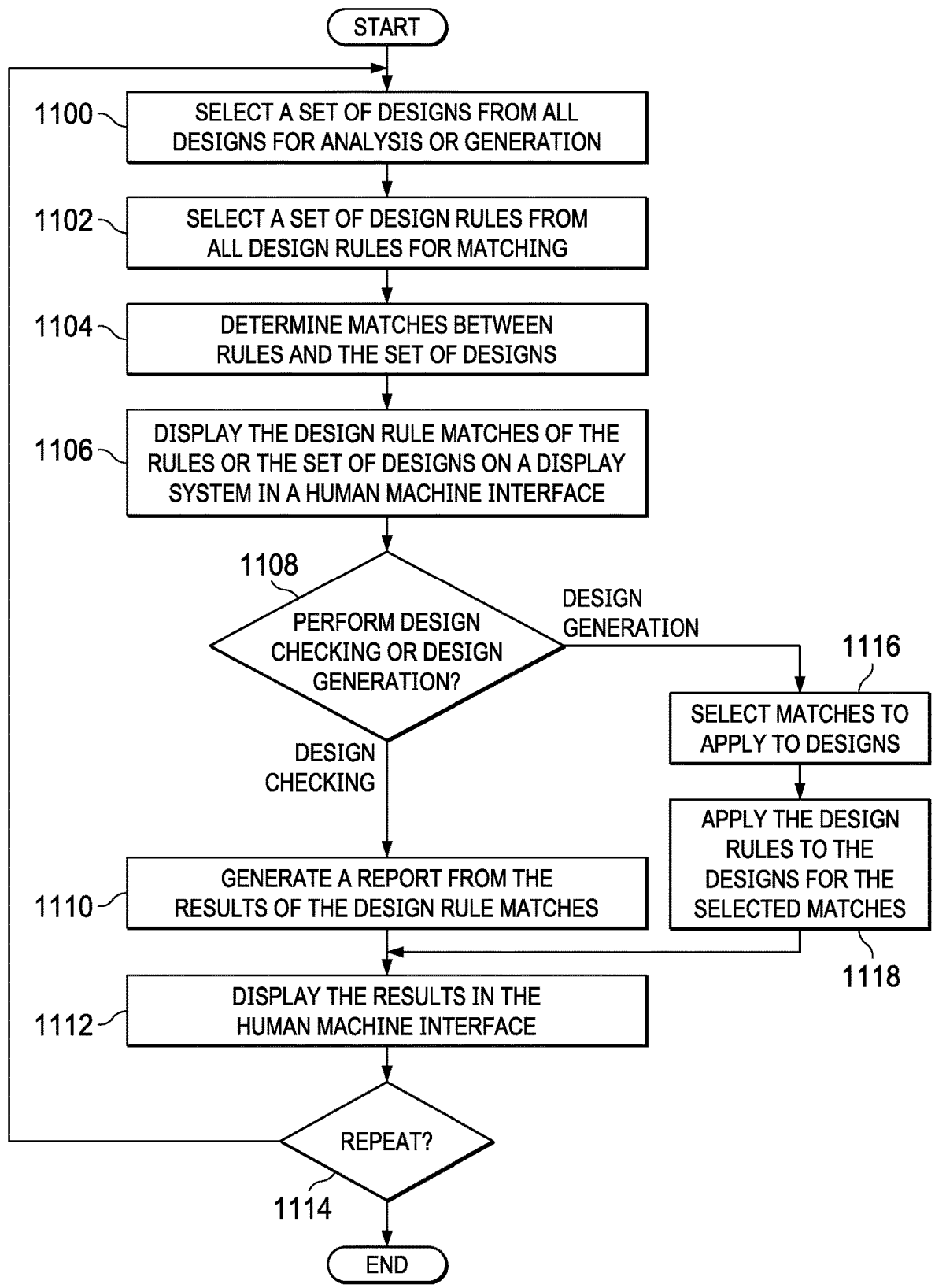
FIG. 11 is an illustration of a flowchart of a process for design checking and generation in accordance with an illustrative embodiment.

With reference now to FIG. 11, an illustration of a flowchart of a process for design checking and generation is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in design generator 112 in computer system 110 in FIG. 1. This process enables at least one generating or checking models for multiple designs.

In this illustrative example, the design rules and the model for the design are loaded into an integrated development environment. The checking and generation of the design is performed in an integrated development environment in this illustrative example. The process begins by selecting a set of designs from all designs for analysis or generation (operation 1100).

The process selects a set of design rules from all design rules for matching (operation 1102). In operation 1104, the process determines which design rules should be used for at least one of checking or design generation. Operation 1102 can be performed by a human operator or by an automated process selecting one or more design rules.

In other illustrative examples, operation 1102 can be performed in the integrated development environment by selecting the rules for the model. The selection can be made based on a number of different factors. For example, a particular product may have selected manufacturer specifications and government regulations. The data design rules, such as location, can be based on applicable manufacturer specifications and government regulations for the product for which the design is being checked or generated. As another example, a particular product may have customer rules. These customer rules can be used to determine which design rules are applied to the model of the design.

The process determines matches between rules and the set of designs (operation 1104). In operation 1104, a model corresponds to a design and multiple models for multiple designs can be present in a set of models for a set of designs. For example, the set of designs can be a multitude of designs of different wing configuration and landing gear configurations of an aircraft.

The process displays the design rule matches of the rules on the set of designs on a display system in human machine interface (operation 1106). The process determines whether to perform design checking or design generation (operation 1108).

If design checking is to be performed, the process generates a report from the results of the design rule matches (operation 1110). The report in this case, can identify issues such as items in the models that are incorrect and need changes or items that can be changed. For example, matches can result identify at least one of an incomplete element in the model, an inconsistency in the model, an incorrect element in the model, or other issues. Further, this report can be interactive. For example, the report can be presented as results in an interactive browser tied to three dimensional visualization views of the design(s) with the matched parts/components highlighted, and with the ability to browse the results and get additional detail on the matched rules, matched parts/components, and designs.

The process then displays the results in a human machine interface (operation 1112). A determination is made as to whether to repeat the process (operation 1114). If the process is to be repeated, the process returns to operation 1100. Otherwise, the process terminates.

With reference again operation 1108, if design generation is to be performed, the process selects matches to apply to designs (operation 1116). The process applies the design rules to the designs for the selected matches (operation 1118). In operation 1118, the design rules are applied to the models of the designs and involves performing operations based on the design rules that match the designs. New or modified models for new or modified designs can be generated based on the application of the design. The process proceeds to operation at 1112 to display the results of the design generation.

Figure 12:
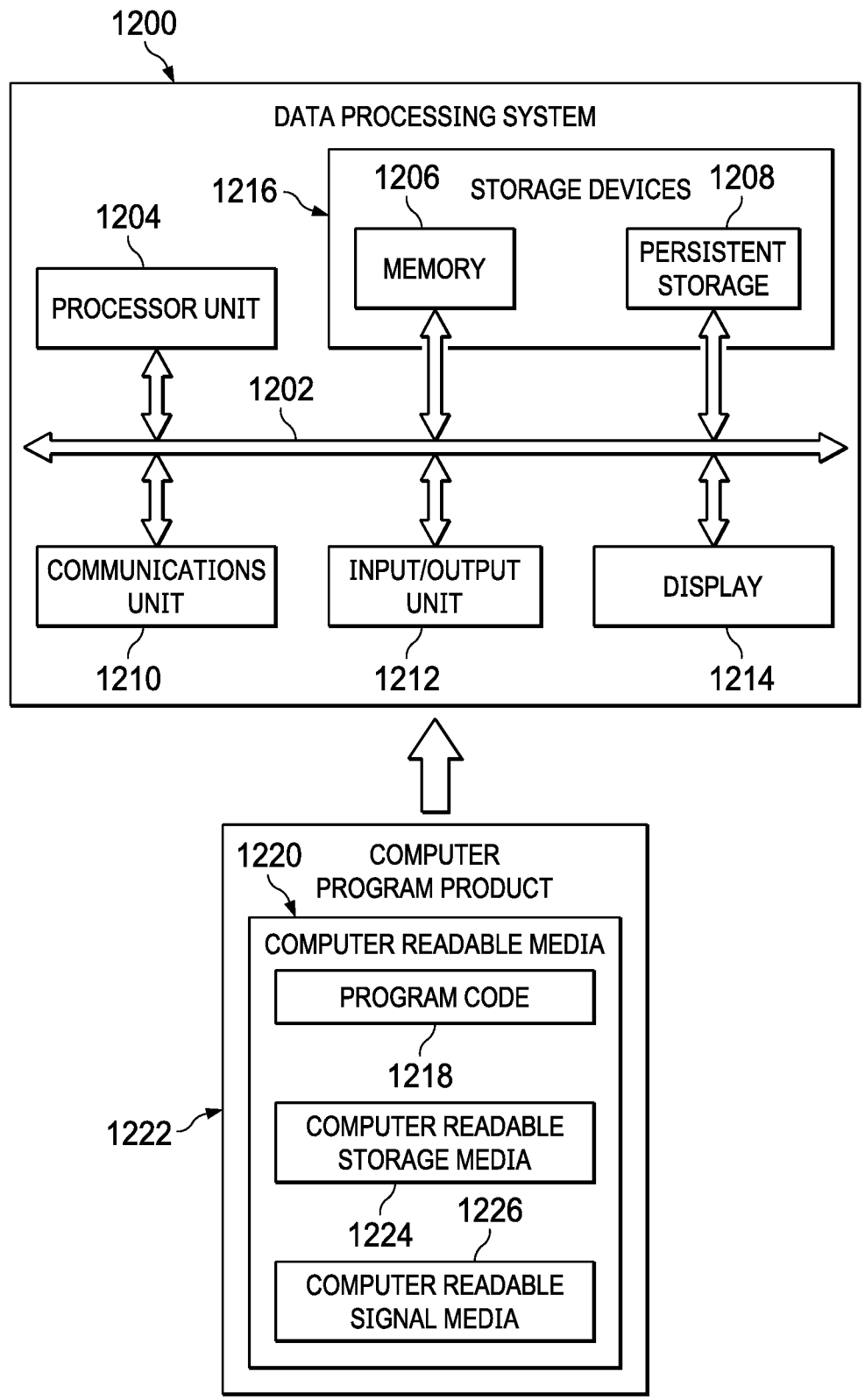
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement computer system 110 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of executing program code 1218.

Figure 13:
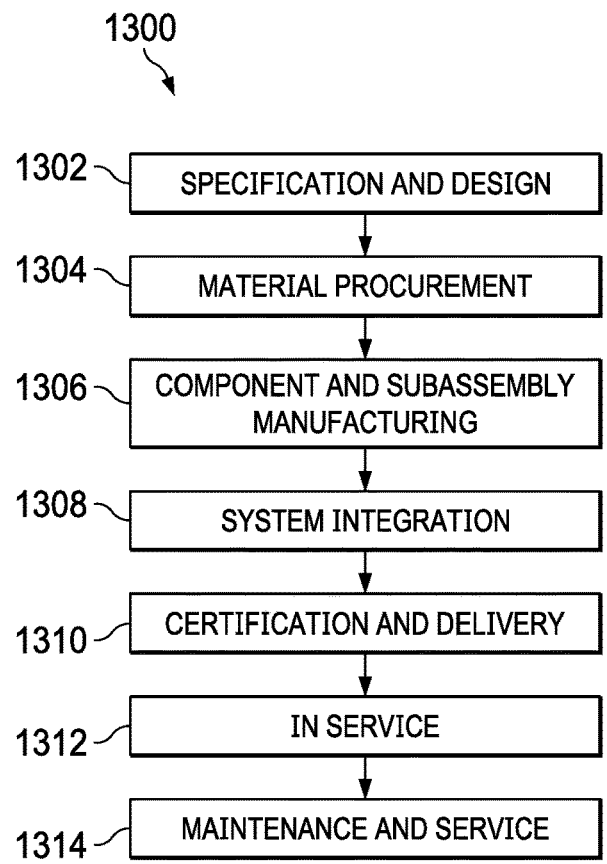
FIG. 13 is an illustration of an aircraft manufacturing and service method in accordance with an illustrative embodiment.
Figure 14:
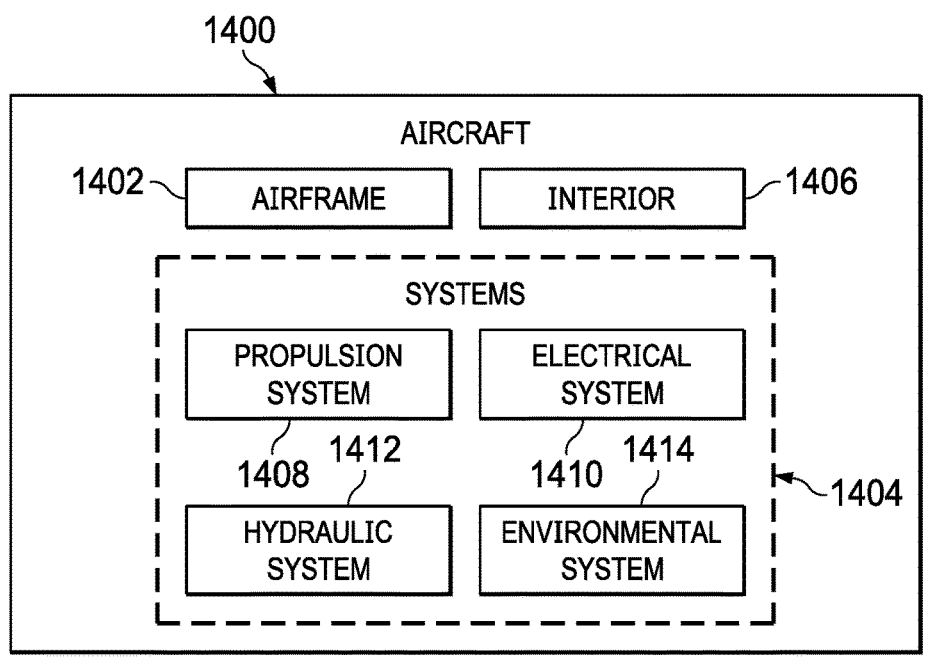
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in can go through certification and delivery 1310 in order to be placed in service 1312. While in service 1312 by a customer, aircraft 1400 in is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

For example, design generator 112 in FIG. 1 can be used to apply design rules written using multiple programming to models during design and specification 1302. As another example, design generator 112 in FIG. 1 can be used to apply design rules for parts that may be needed during maintenance and service 1314. For example, over the lifecycle of aircraft 1400 changes to designs for parts may be made to improve fuel efficiency, improve safety, reduce maintenance, and for other purposes. The application of design rules to be changes in the models for the parts can be performed for at least one of include modification, reconfiguration, refurbishment, or other maintenance or service in maintenance and service 1314.

Figure 15:
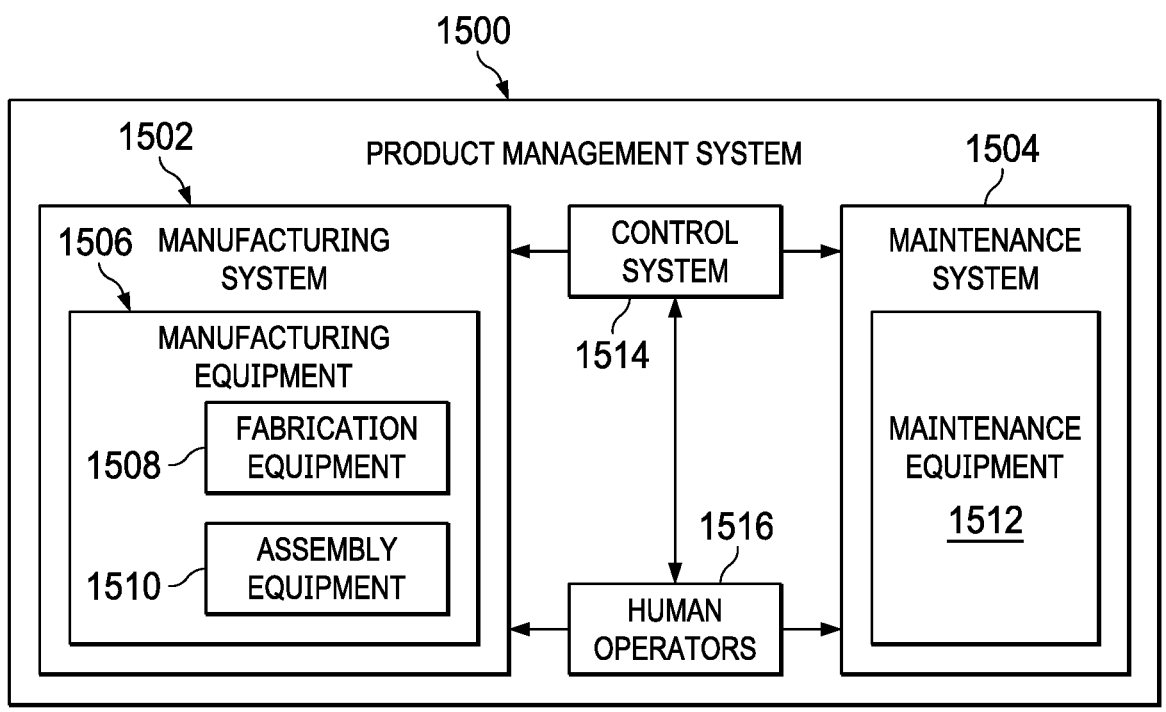
FIG. 15 is an illustration of a block diagram of a product management system in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 includes at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that used to fabricate components for parts used to form aircraft 1400 in FIG. 14. For example, fabrication equipment 1508 can include machines and tools. These machines and tools can be at least one of a drill, a hydraulic press, a furnace, a mold, a composite tape laying machine, a vacuum system, a lathe, or other suitable types of equipment. Fabrication equipment 1508 can be used to fabricate at least one of metal parts, composite parts, semiconductors, circuits, fasteners, ribs, skin panels, spars, antennas, or other suitable types of parts.

Assembly equipment 1510 is equipment used to assemble parts to form aircraft 1400 in FIG. 14. In particular, assembly equipment 1510 is used to assemble components and parts to form aircraft 1400 in FIG. 14. Assembly equipment 1510 also can include machines and tools. These machines and tools may be at least one of a robotic arm, a crawler, a fastener installation system, a rail-based drilling system, or a robot. Assembly equipment 1510 can be used to assemble parts such as seats, horizontal stabilizers, wings, engines, engine housings, landing gear systems, and other parts for aircraft 1400 in FIG. 14.

In this illustrative example, maintenance system 1504 includes maintenance equipment 1512.

Maintenance equipment 1512 can include any equipment needed to perform maintenance on aircraft 1400 in FIG. 14. Maintenance equipment 1512 may include tools for performing different operations on parts on aircraft 1400 in FIG. 14. These operations can include at least one of disassembling parts, refurbishing parts, inspecting parts, reworking parts, manufacturing replacement parts, or other operations for performing maintenance on aircraft 1400 in FIG. 14. These operations can be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable devices. In some cases, maintenance equipment 1512 can include fabrication equipment 1508, assembly equipment 1510, or both to produce and assemble parts that needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 can control the operation of at least one of fabrication equipment 1508, assembly equipment 1510, or maintenance equipment 1512.

The hardware in control system 1514 can be implemented using hardware that may include computers, circuits, networks, and other types of equipment. The control may take the form of direct control of manufacturing equipment 1506. For example, robots, computer-controlled machines, and other equipment can be controlled by control system 1514. In other illustrative examples, control system 1514 can manage operations performed by human operators 1516 in manufacturing or performing maintenance on aircraft 1400. For example, control system 1514 can assign tasks, provide instructions, display models, or perform other operations to manage operations performed by human operators 1516. In these illustrative examples, design generator 112 in FIG. 1 can be implemented in control system 1514 to manage at least one of the manufacturing or maintenance of aircraft 1400 in FIG. 14. For example, design generator 112 can be used to ensure models of products such as aircraft 1400 and parts for aircraft 1400 meet at least one of an industry standard, a manufacturer specification, a government regulation, or other requirement with respect to aircraft 1400 and parts for aircraft 1400. Design generator 112 can modify designs or generate alerts as examples of some operations that can be performed in applying design rules to model.

In the different illustrative examples, human operators 1516 can operate or interact with at least one of manufacturing equipment 1506, maintenance equipment 1512, or control system 1514. This interaction can occur to manufacture aircraft 1400 in FIG. 14.

Of course, product management system 1500 may be configured to manage other products other than aircraft 1400 in FIG. 14. Although product management system 1500 has been described with respect to manufacturing in the aerospace industry, product management system 1500 can be configured to manage products for other industries. For example, product management system 1500 can be configured to manufacture products for the automotive industry as well as any other suitable industries.

Thus, the illustrative examples provide a method, apparatus, system, and computer program product for multi-language processing of a design rule. A request is received to apply the design rule to a model of a product. The design rule is written in a source code that is run to apply the design rule to the model. Sections in the source code corresponding to different programming languages are identified. The source code for the design rule is run using language processors corresponding to the different programming languages identified in the sections in the source code and using language configuration information that describes parameters for executing the source code using the language processors, wherein a set of operations is performed on the model when the source code is run.

In the illustrative examples, the use of design generator 112 in computer system 110 in FIG. 1 integrates processes into a practical application for multi-language processing of a design rule that increases the performance of computer system 110. For example, design rules can be written in which a design rule includes source code from two or more programming languages. The selection of programming languages for sections of source code in the design rule can be based on which programming language is most efficient or powerful for implementing a portion of the rule. The efficiency can be at least one of increasing a speed at which rules are applied to models or decreasing resources used in computer system 110. Further, the use of design rules in multiple languages can also reduce the effort or difficulty in creating design rules.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of using a computer system for multi-language processing of a design rule, the method comprising:
  receiving a request to apply the design rule to a model of a product, wherein the design rule is written in a source code that is run to apply the design rule to the model;
  identifying sections in the source code corresponding to different programming languages; and
  executing the source code for the design rule using language processors corresponding to the different programming languages identified in the sections in the source code and using language configuration information that describes parameters for executing the source code using the language processors, wherein a set of operations is performed on the model when the source code is run.

2. The method of claim 1, wherein executing the source code for the design rule using the language processors corresponding to the different programming languages identified in the sections in the source code and using the language configuration information that describes the parameters for executing the source code using the language processors comprises:
  initializing an instance of a language processor for each different programming language in the different programming languages identified in the sections in the source code for the design rule to form instances of the language processors; and
  executing the source code in a section in the sections using the instance of the language processor corresponding to a programming language in the different programming languages identified for the section.

3. The method of claim 1, wherein the language configuration information comprises a name of a programming language and a location of a language processor.

4. The method of claim 3, wherein the language configuration information further includes at least one of a version requirement, a project specific parameter, or a language specific parameter.

5. The method of claim 1, wherein the language configuration information is located in at least one of the source code, a file, a module, or a data structure.

6. The method of claim 1, wherein the request includes a set of design rules in addition to the design rule for application to the model of the product and further comprising:
  identifying additional sections in additional source code for set of rules corresponding to additional different programming languages; and
  executing the additional source code for the set of design rules in parallel with the source code for the design rule using additional language processors corresponding to the additional different programming languages identified in the additional sections in the additional source code and using additional language configuration information that describes the parameters for executing the additional source code using the additional language processors, wherein the set of operations is performed on the model when the source code and the additional source code are run.

7. The method of claim 1, wherein the design rule comprises a match condition and the set of operations that is performed, wherein the match condition indicates that the design rule is applicable and wherein the match condition is in a first set of programming languages in a plurality of programming languages and the set of operations is in a second set of programming languages in the plurality of programming languages.

8. The method of claim 1, wherein the request is received during at least one of a design generation, a design modification, or a design checking.

9. The method of claim 1, wherein the set of operations is selected from at least one of: modify a geometry in the design, generate a new geometry, set an attribute, modify an attribute, or apply another design rule.

10. The method of claim 1, wherein the model is one of a two-dimensional model of the product or a three-dimensional model of the product.

11. The method of claim 1, wherein the product selected from a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a wing, an engine, a cowling, a fairing, a leading lead slat, a skin panel, a fastener, a wiring subassembly, a light, a door, a bin, a pipe, a handle, switch, a chip, a processor unit, a robotic arm, or a crawler.

12. A design rule application system comprising:
  a computer system; and
  a design generator in the computer system, wherein the design generator is configured to:

receive a request to apply a design rule to a model of a product, wherein the design rule is written in a source code that is run to apply the design rule to the model;

identify sections in the source code corresponding to different programming languages; and run the source code for the design rule using language processors corresponding to the different programming languages identified in the sections in the source code and using language configuration information that describes parameters for executing the source code using the language processors, wherein a set of operations is performed on the model when the source code is run.

13. The design rule application system of claim 12, wherein at least one of the design generator or the language processor runs in at least one of a virtual machine, a system virtual machine, a process virtual machine, a Java virtual machine, or a physical computer.

14. The design rule application system of claim 12, wherein in run the source code for the design rule using language processors, the design generator is configured to:

initialize an instance of a language processor for each different programming language in the different programming languages identified in the sections in the source code for the design rule to form instances of the language processors; and run the source code in a section in the sections using the instance of the language processor corresponding to a programming language in the different programming languages identified for the section.

15. The design rule application system of claim 12, wherein the language configuration information comprises a name of a programming language and a location of a language processor.

16. The design rule application system of claim 15, wherein the language configuration information further includes at least one of a version requirement, a project specific parameter, or a language specific parameter.

17. The design rule application system of claim 12, wherein the language configuration information is located in at least one of the source code, a file, a configuration file, a module, or a data structure.

18. The design rule application system of claim 12, wherein the request includes a set of design rules in addition to the design rule for application to the model of the product and the design generator is configured to:

identify additional sections in additional source code for set of rules corresponding to additional different programming languages; and run the additional source code for the set of design rules in parallel with the source code for the design rule using additional language processors corresponding to the additional different programming languages identified in the additional sections in the additional source code and using additional language configuration information that describes the parameters for executing the additional source code using the additional language processors, wherein the set of operations is performed on the model when the source code and the additional source code are run.

19. The design rule application system of claim 12, wherein the design rule comprises at match condition and the set of operations that is performed if the match condition indicates that the design rule is applicable and wherein the match condition is in a first set of programming languages in a plurality of programming languages and the set of operations is in a second set of programming languages in the plurality of programming languages.

20. The design rule application system of claim 12, wherein the request is received during at least one of a design generation, a design modification, or a design checking.

21. The design rule application system of claim 12, wherein the set of operations is selected from at least one of modify a geometry in the design, generate a new geometry, set an attribute, modify an attribute, or apply another design rule.

22. The design rule application system of claim 12, wherein the model is one of a two-dimensional model of the product or a three-dimensional model of the product.

23. The design rule application system of claim 12, wherein the product selected from a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a wing, an engine, a cowling, a fairing, a leading lead slat, a skin panel, a fastener, a wiring subassembly, a light, a door, a bin, a pipe, a handle, switch, a chip, a processor unit, a robotic arm, or a crawler.

24. A computer program product for multi-language processing of a design rule, the computer program product comprising:

a computer-readable storage media;

first program code, stored on the computer-readable storage media, for receiving a request to apply the design rule to a model of a product, wherein the design rule is written in a source code that is run to apply the design rule to the model;

second program code, stored on the computer-readable storage media, for identifying sections in the source code corresponding to different programming languages; and third program code, stored on the computer-readable storage media, for executing the source code for the design rule using language processors corresponding to the different programming languages identified in the sections in the source code and using language configuration information that describes parameters for executing the source code using the language processors, wherein a set of operations is performed on the model when the source code is run.

* * * * *